United States Patent
Brei et al.

(10) Patent No.: US 6,585,442 B2
(45) Date of Patent: Jul. 1, 2003

(54) ATTACHMENT MECHANISM

(75) Inventors: Diann E. Brei, Milford, MI (US); Joseph W. Clement, Ann Arbor, MI (US); Paul W. Alexander, Ann Arbor, MI (US); Christopher W. Deyer, Troy, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/847,373

(22) Filed: May 2, 2001

(65) Prior Publication Data

US 2002/0040949 A1 Apr. 11, 2002

Related U.S. Application Data

(60) Provisional application No. 60/201,461, filed on May 3, 2000.

(51) Int. Cl.$^7$ .............................. F16B 5/07; F16B 5/00
(52) U.S. Cl. ............................ 403/13; 403/14; 403/410
(58) Field of Search ........................... 403/13, 14, 410; 310/309, 328

(56) References Cited

U.S. PATENT DOCUMENTS

| | | | | |
|---|---|---|---|---|
| 3,279,863 A | * | 10/1966 | Boulandon et al. | 406/19 |
| 4,399,675 A | * | 8/1983 | Erdmann et al. | 72/37 |
| 5,206,557 A | * | 4/1993 | Bobbio | 310/309 |
| 5,962,949 A | * | 10/1999 | Dhuler et al. | 310/307 |
| 6,070,656 A | * | 6/2000 | Dickey | 165/114.26 |
| 6,075,924 A | * | 6/2000 | Will | 395/95 |

OTHER PUBLICATIONS

Ataka M., Omodaka A., Takeshima N., Fujita H., "Fabrication and Operation of Polyimide Bimorph Actuators for a Ciliary Motion System," Journal of Microelectromechanical Systems, Dec. 1993, vol. 2, No. 4, pp 146–150.

Bohringer K.F., Donald B.R., Kavraki L.E., Lamiraux F., "Part Orientation with One or Two Stable Equilibria Using Programmable Force Fields," IEEE Transactions on Robiotics and Automation, Apr. 2000, vol. 16, No. 2, pp 157–170.

Bohringer K.F., Donald B.R., MacDonald N.C., "Programmable Force Fields for Distributed Manipulation, with Applications to MEMS Actuator Arrays and Vibratory Parts Feeders," The International Journal of Robotics Research, Feb. 1999, vol. 18, No. 2, pp 168–200.

Bohringer K.F., Donald B.R., MacDonald N.C., "What Programmable Vector Fields Can (and Cannot) Do: Force Field Algorithms for MEMS and Vibratory Plate Parts Feeders," Proceedings of the 1996 IEEE International Conference on Robotics and Automation, Minneapolis, MN, Apr. 1996, pp 822–829.

(List continued on next page.)

*Primary Examiner*—J. J. Swann
*Assistant Examiner*—Ruth C. Rodriguez
(74) *Attorney, Agent, or Firm*—Harness, Dickey & Pierce, P.L.C.

(57) ABSTRACT

An attachment mechanism having a first attachment member supported by a first body. The first attachment member includes an engaging portion. A plurality of second attachment members is also provided and is supported by a second body. Each of the plurality of second attachment members includes an engaging portion selectively engageable with the engaging portion of the first attachment member. An actuating device is further provided and coupled with the plurality of second attachment members. The actuation device is operable to selectively actuate the plurality of second attachment members relative to the first attachment member to positionally manipulate the first body relative to the second body while the plurality of second attachment members is engaged with the first attachment member.

42 Claims, 10 Drawing Sheets

OTHER PUBLICATIONS

Bohringer K.F., Donald B.R., Mihailovich R., MacDonald N.C., "A Theory of Manipulation and Control for Microfabricated Actuator Arrays," Proceedings of the 1994 IEEE Workshop on Micro Electro Mechanical Systems, Jan. 25–28, 1994, pp 102–107.

Bohringer K.F., Suh J.W., Donald B.R., Darling R.B., Kovacs G.T.A., "Vector Fields for Task–level Distributed Manipulation: Experiments with Organic Micro Actuator Arrays," Proceedings of the 1997 IEEE International Conference on Robotics and Automation, Albuquerque, NM, Apr. 20–25, 1997, vol. 2, pp 1779–1786.

Carter P., Naghdy F., Laszlo N., Cook C.D., Wong P., "Study of Actuator Technologies for a Miniature Distributed Manipulation Environment," pp 661–665.

Clement J. W., Brei D. E. "Proof–of–Concept Investigation of Active Velcro For Smart Attachment Mechanisms," 42nd AIAA/ASME/ASCE/AHS/ASC Structures, Structural Dynamics, and Materials Conference and Exhibit Technical Papers, Seattle, WA, Apr. 16–19, 2001, pp 1–11.

Ebefors, T., Mattsson, J.U., Kalvesten, E., Stemme, G., "A Robust Micro Conveyor Realized by Arrayed Polyimide Joint Actuators," Proceedings of the 1999 IEEE International Conference on Micro Electro Mechanical Systems, Jan. 17–21, 1999, pp 576–581.

Fujita H., Konishi S., Furuhata T., Takeshima N., "A Proposal for a Conveyance System with Parallel Cooperative Micro Modules," pp 656–660.

Furuhata T., Hirano T., Fujita H., "Array–Driven Ultrasonic Mictoactuators—Arrayed microactuator modules that have swing pins—," 1991 IEEE, pp 1056–1059.

Iizuka T., Fujita H., "Precise Positioning of a Micro Conveyor Based on Superconducting Magnetic Levitation," Proceedings of the 1997 IEEE International Symposium on Micromechatronics and Human Science, Oct. 5–8, 1997, pp 131–135.

Konishi S., Fujita H., "A Conveyance System Using Air Flow Based on the Concept of Distributed Micro Motion Systems," Journal of Microelectromechanical Systems, Jun. 1994, vol. 3, No. 2, pp 54–58.

Langlet P., Collard D., Akiyama T., Fujita H., "A Quantitative Analysis of Scratch Drive Actuation for Integrated X/Y Motion System," 1997 International Conference on Solid State Sensors and Actuators, Chicago, IL, Jun. 16–19, 1997, vol. 2, pp 773–776.

Luntz J., Messner W., "A Distributed Control System for Flexible Materials Handling," IEEE Control Systems, Feb. 1997, pp 22–28.

Luntz J., Messner W., Choset H., "Parcel Manipulation and Dynamics with a Distributed Actuator Array: The Virtual Vehicle," Proceedings of the 1997 IEEE International Conference on Robotics and Automation, Albuquerque, NM, Apr. 1997, pp 1541–1546.

Luntz J., Messner W., Choset H., "Stick–Slip Operation of the Modular Distributed Manipulator System," Proceedings of the American Control Conference, Philadelphia, PA, Jun. 1998, pp 3853–3857.

Luntz J.E., Messner W., Choset H., "Closed–Loop Operation of Actuator Arrays," Proceedings of the 2000 IEEE International Conference on Robotics and Automation, San Francisco, CA, Apr. 24–28, 2000, vol. 4, pp 3666–3672.

Luntz J.E., Messner W., Choset H., "Discrete Actuator Array Vectorfield Design for Distributed Manipulation," Proceedings of the 1999 IEEE International Conference on Robotics and Automation, Detroit, MI, May 10–15, 1999, vol. 3, pp 2235–2241.

Luntz J.E., Messner W., Choset H., "Open Loop Orientability of Objects on Actuator Arrays," Proceedings of the 1999 IEEE International Conference on Robotics and Automation, Detroit, MI, May 10–15, 1999, vol. 3, pp 2242–2248.

Nakazawa, H., Watanabe, Y., Morita, O., Edo, M., Yonezawa, E., "The Two–Dimensional Micro Conveyor: Principles and Fabrication Process of the Actuator," 1997 International Conference on Solid State Sensors and Actuators, Chicago, IL, Jun. 16–19, 1997, vol. 1, pp 33–36.

Reznik D., Brown S., Canny J., "Dynamic Simulation as a Design Tool for a Microactuator Array," Proceedings of the 1997 IEEE International Conference on Robotics and Automation, Albuquerque, NM, Apr. 1997, pp 1675–1680.

Smits J.G., "Is Micromechanics Becoming a New Subject for Academic Courses or the Design of a Piezoelectric on Silicon Microrobot," 1989 IEEE Eighth Biennial University/Government/Industry Symposium, pp 141–145.

Suh J.W., Darling R.B., Bohringer K.F., Donald B.R., Baltes H., Kovacs G.T.A., "CMOS Integrated Ciliary Actuator Array as a General–Purpose Micromanipulation Tool for Small Objects," Journal of Microelectromechanical Systems, Dec. 1999, vol. 8, No. 4, pp 483–496.

Tadokoro S., Fuji S., Fushimi M., Kanno R., Kimura T., Takamori T., Oguro K., "Development of a Distributed Actuation Device Consisting of Soft Gel Actuator Elements," Proceedings of the 1998 IEEE International Conference on Robotics and Automation, Leuven, Belgium, May 16–20, 1998, vol. 3, pp 2155–2160.

Tadokoro S., Kimura I, Takamori T., "A Dexterity Measure for Trajectory Planning and Kinematic Design of Redundant Manipulators," 1989 IEEE, pp 415–420.

Tadokoro S., Yamagami S., Ozawa M., Kimura T., Takamori T., "Multi–DOF Device for Soft Micromanipulation Consisting of Soft Gel Actuator Elements," Proceedings of the 1999 IEEE International Conference on Robotics & Automation, Detroit, MI, May 1999, pp 2177–2182.

Tadokoro S., Yamagami S., Ozawa M., Kimura T., Takamori T., "Soft Micromanipulation Device with Multiple Degrees of Freedom Consisting of High Polymer Gel Actuators," 1999, pp 37–42.

Yim M., Duff D.G., Roufas K.D. "PolyBot: a Modular Reconfigurable Robot," Proceedings of the 2000 IEEE International Conference on Robotics and Automation, San Francisco, CA, Apr. 24–28, 2000, vol. 1, pp. 514–520.

* cited by examiner

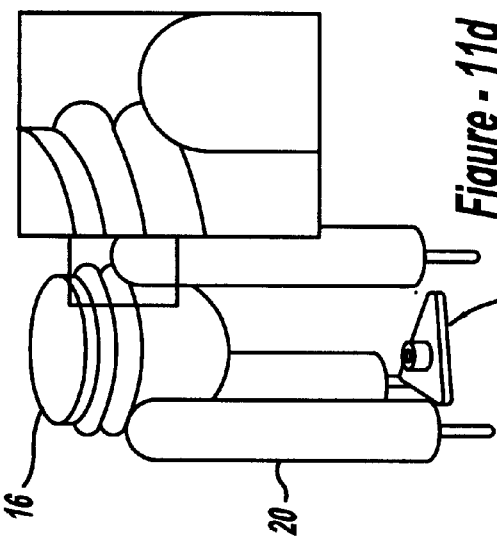
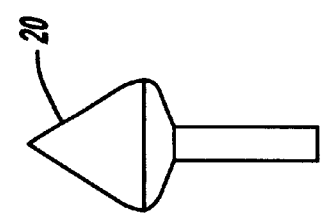
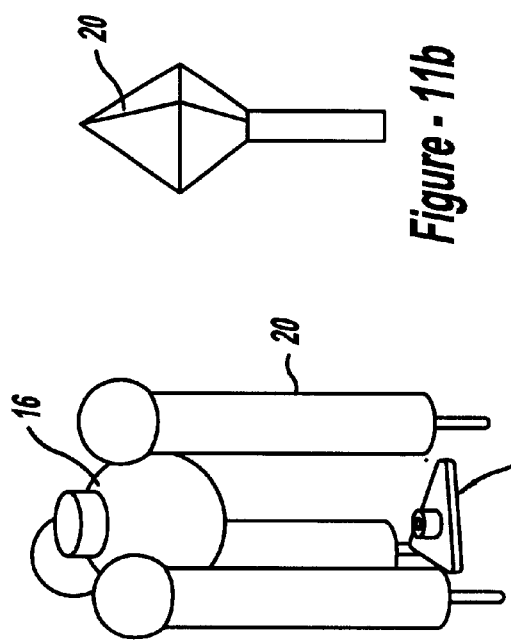
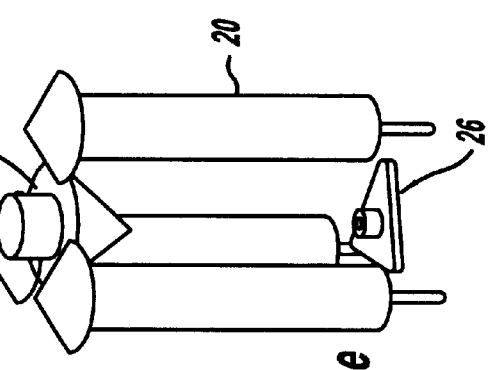
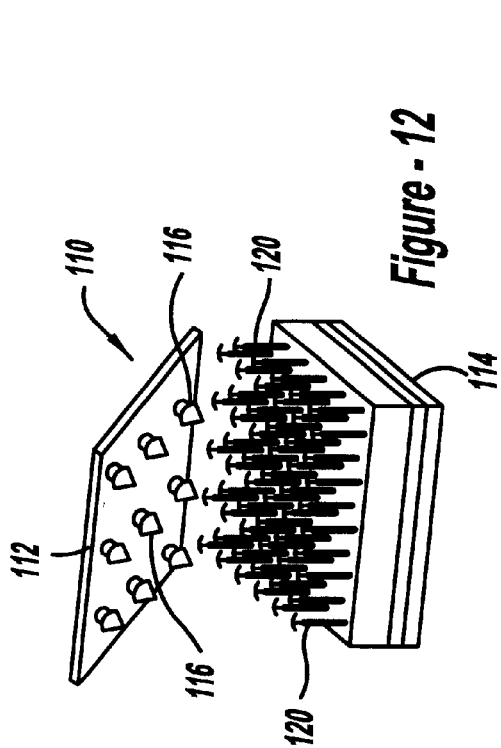
Figure - 11a
Figure - 11b
Figure - 11c
Figure - 11d
Figure - 11e
Figure - 12

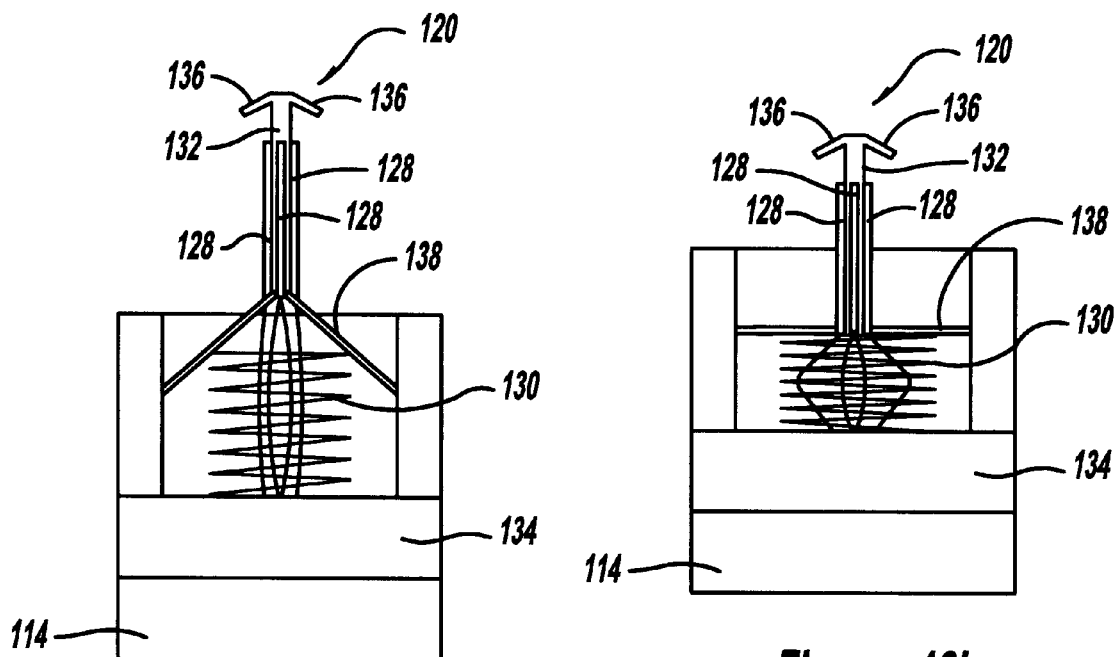
Figure - 13a
Figure - 13b
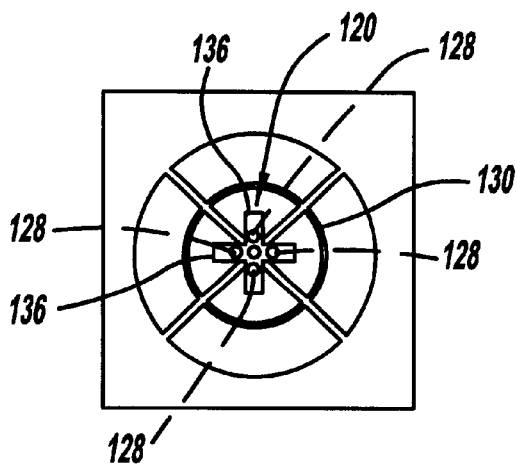
Figure - 13c
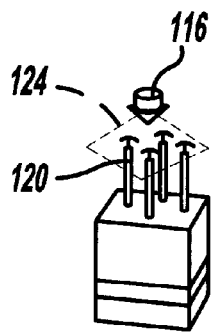
Figure - 14a
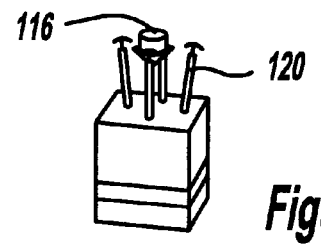
Figure - 14b
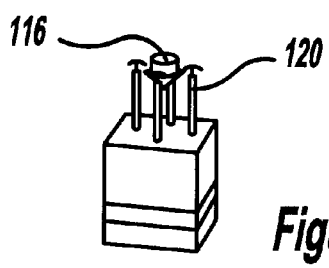
Figure - 14c

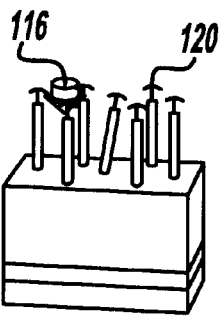
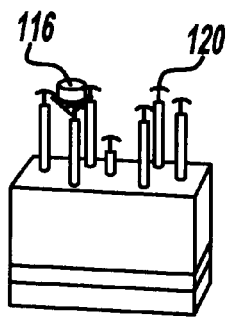
*Figure - 15a*   *Figure - 15b*
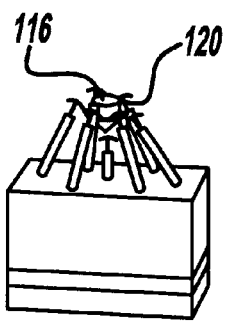
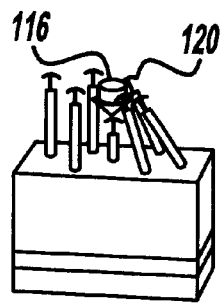
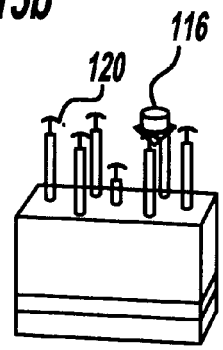
*Figure - 15c*   *Figure - 15d*   *Figure - 15e*
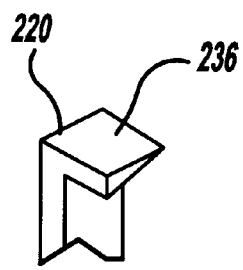
*Figure - 18*
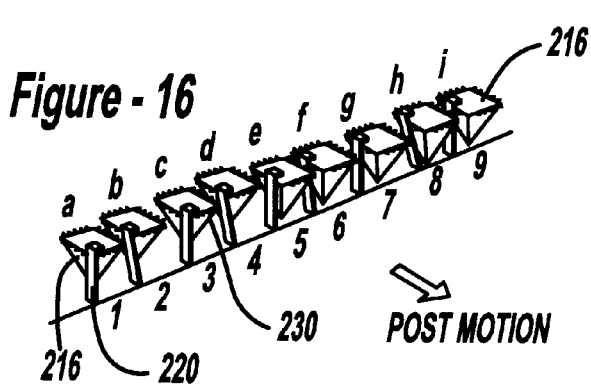
*Figure - 16*
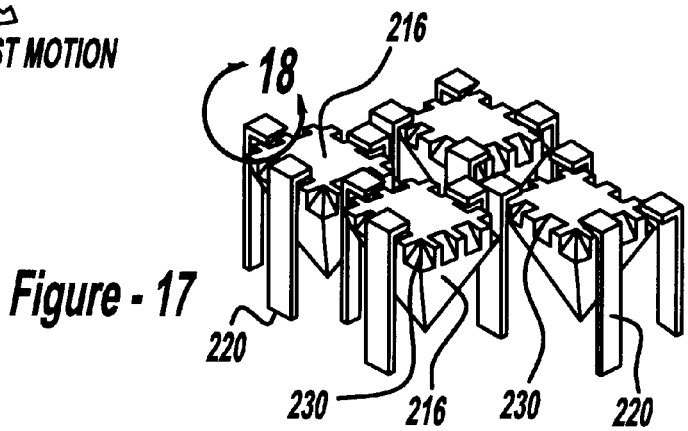
*Figure - 17*

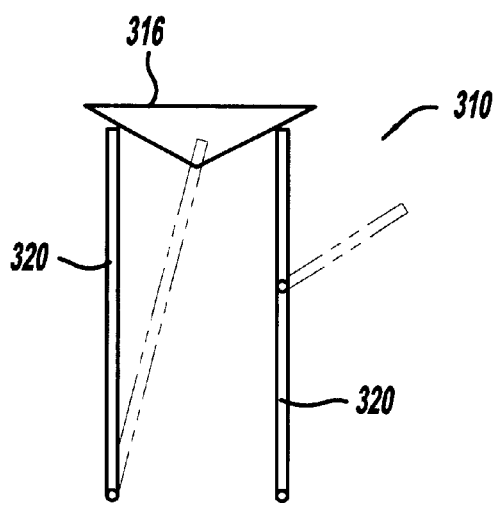
*Figure - 19*
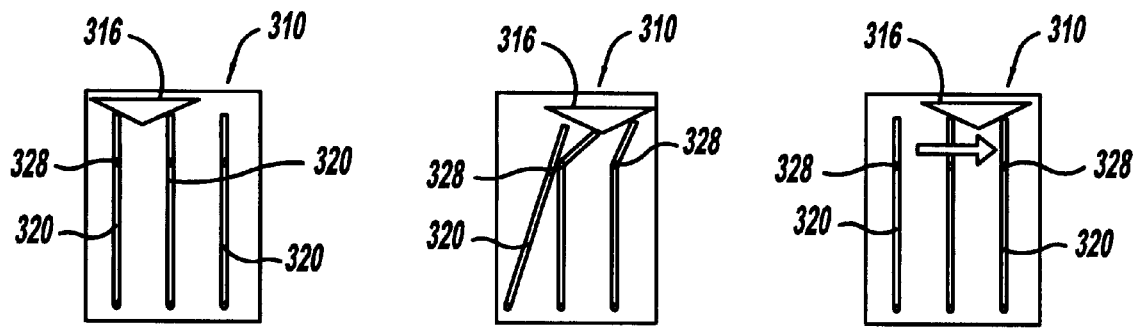
*Figure - 20a*   *Figure - 20b*   *Figure - 20c*
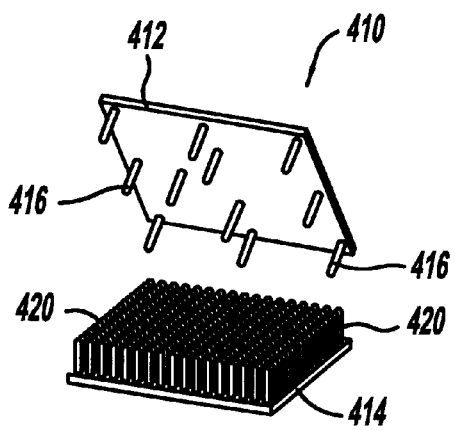
*Figure - 21*
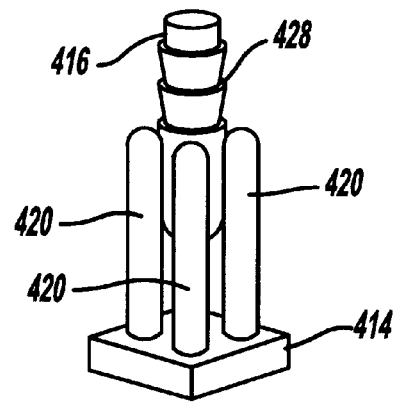
*Figure - 22*

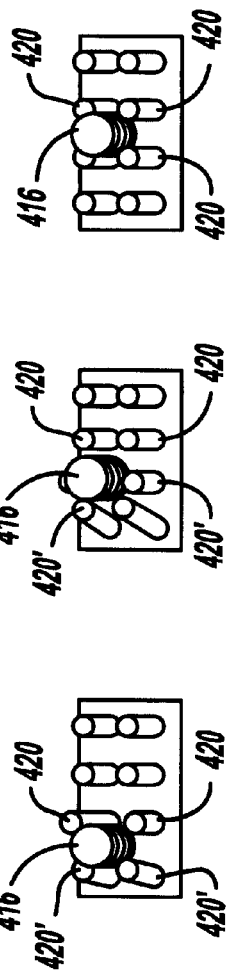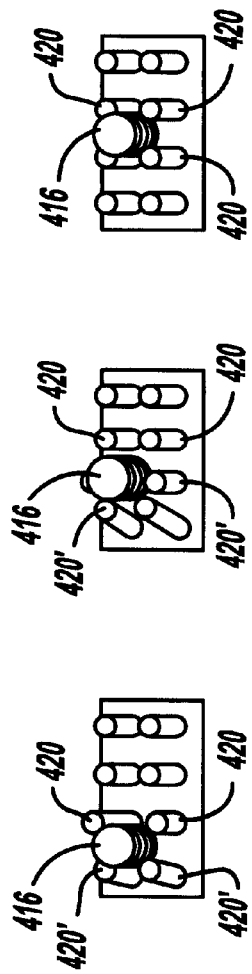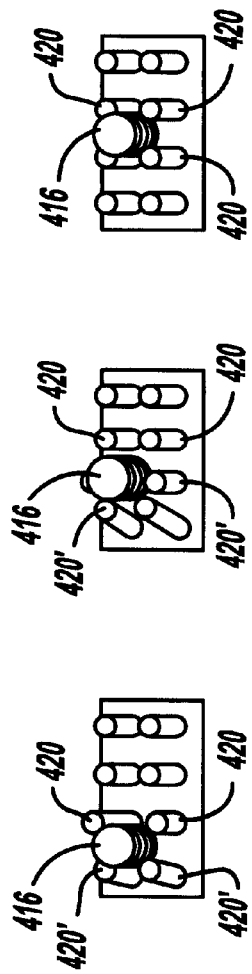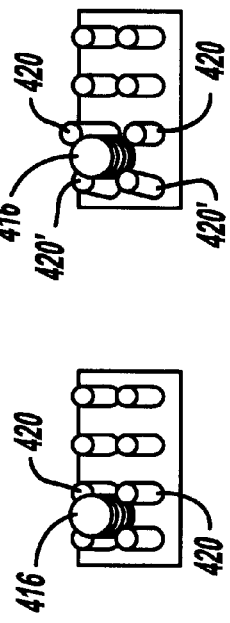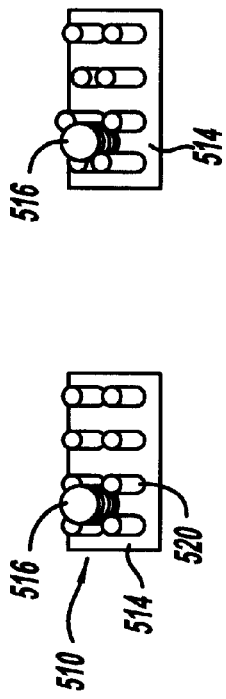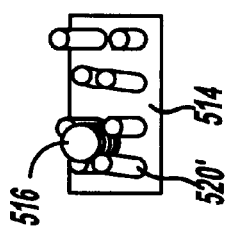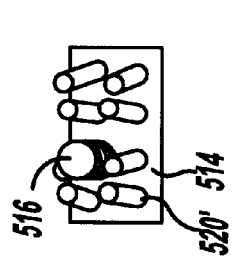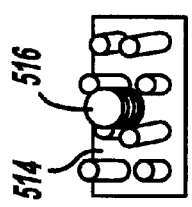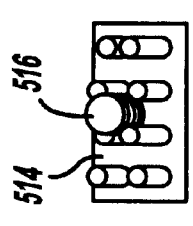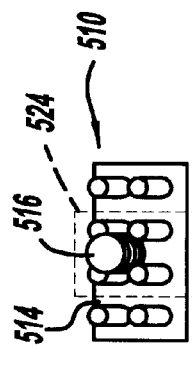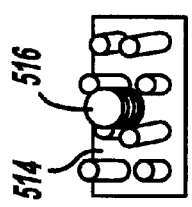

ATTACHMENT MECHANISM

CROSS-REFERENCE TO RELATED APPLICATIONS

This application claims the benefit of U.S. Provisional Application No. 60/201,461, filed May 3, 2000.

STATEMENT OF GOVERNMENTAL SUPPORT

This invention was made with Government support under Grant No. F29601-98-D-0210 awarded by the Defense Advanced Research Projects Agency. The Government has certain rights in this invention.

FIELD OF THE INVENTION

The present invention relates to attachment mechanisms and, more particularly, relates to an attachment mechanism capable of retaining a pair of members and simultaneously translating and rotating the members relative to each other.

BACKGROUND OF THE INVENTION

Advancements in technology have made it possible to design and fabricate microsatellites (i.e. less than 100 kg in size) with the same level of performance as conventional satellites. The lower cost and weight of these microsatellites relative to conventional satellites has provided many additional uses for these microsatellites that were previously cost prohibitive. By reducing the weight of these satellites, low cost airborne launching methods can replace the costly, time inflexible, ground launches.

An important application of microsatellites is the ability to dock with larger satellites currently in orbit to repair, upgrade, or replenish the expendables of these more expensive satellites. Traditional docking mechanisms generally require precise alignment of the two satellites along three axes to effect reliable engagement, which increases the cost and complexity of the docking system on each satellite. However, with the occasional interruption of communication with these satellites, it is preferable that the docking of these satellites occur autonomously to insure satellite capture and minimize the human control requirements. This autonomous docking would insure that a satellite is not lost due to power failures or actuation failures. This further allows the docking mechanism to be powered down prior to satellite capture to reduce power consumption.

It is also preferable that the surface engagement between the various satellites occur independent of the approaching microsatellites relative position, orientation, and angle of incidence. Moreover, the required force for surface engagement should be minimized to reduce the risk of the satellite "bouncing off" during the engagement process. However, the retention force should be maximized to prevent premature separation, which could result in the loss of the microsatellite. Still further, it is preferable to be able to actively translate, manipulate, rotate, and the like, one satellite relative to the other to effect a proper capture and dock. Accordingly, there exists a need to provide a simple and convenient method of docking a microsatellite with an existing satellite that is capable of generating relative motion therebetween while maintaining positive attachment.

Generally, the need to provide a simple and convenient attachment mechanism transcends satellite-type applications. That is, there exists a particular need to provide an attaching mechanism that is capable of maintaining positive attachment while translating one member relative to another member in many different industries and environments, such as manufacturing, exploration, etc.

Accordingly, there exists a need in the relevant art to provide an attachment mechanism that is capable of actively retaining a first member to a second member. Furthermore, there exists a need in the relevant art to provide an attachment mechanism that is capable of actively retaining a first member to a second member while simultaneously generating relative motion therebetween. Still further, there exists a need in the relevant art to provide an attachment mechanism that is capable of overcoming the disadvantages of the prior art.

SUMMARY OF THE INVENTION

According to the teaching of the present invention, an attachment mechanism having an advantageous construction is provided. The attachment mechanism includes a first attachment member supported by a first body. The first attachment member includes an engaging portion. A plurality of second attachment members is also provided and is supported by a second body. Each of the plurality of second attachment members includes an engaging portion selectively engageable with the engaging portion of the first attachment member. An actuating device is further provided and coupled with the plurality of second attachment members. The actuation device is operable to selectively actuate the plurality of second attachment members relative to the first attachment member to positionally manipulate the first body relative to the second body while the plurality of second attachment members is engaged with the first attachment member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 11a is a perspective view illustrating a spherical end topology;

FIG. 11b is a perspective view illustrating a tetrahedron topology;

FIG. 11c is a perspective view illustrating a bulb topology;

FIG. 11d is a perspective view illustrating a mutually unique curve topology;

FIG. 11e is a perspective view illustrating a conical end topology;

FIG. 12 is a perspective view illustrating an attachment mechanism according to a second embodiment of the present invention;

FIG. 13a is a side view illustrating the attachment mechanism according to the second embodiment of the present invention in a raised position;

FIG. 13b is a side view illustrating the attachment mechanism according to the second embodiment of the present invention in a retracted position;

FIG. 13c is a plan view illustrating the attachment mechanism according to the second embodiment of the present invention;

FIGS. 14a–14c are perspective views illustrating the progressive insertion steps of the post relative to the prong members according to the second embodiment of the present invention;

FIGS. 15a–15e are perspective views illustrating the progressive translation steps of the post relative to the prong members according to the second embodiment of the present invention;

FIGS. 16a–16i are perspective views illustrating the progressive translation steps of a post relative to a prong member according to a third embodiment of the present invention;

FIG. 17 is a perspective view illustrating an attachment mechanism according to a third embodiment of the present invention;

FIG. 18 is an enlarged perspective view illustrating the end of a prong according to the third embodiment of the present invention;

FIG. 19 is a schematic view illustrating an attachment mechanism according to a fourth embodiment of the present invention;

FIGS. 20a–20c are perspective views illustrating the progressive translation steps of the post relative to the prong member according to the fourth embodiment of the present invention;

FIG. 21 is a perspective view illustrating an attachment mechanism according to a fifth embodiment of the present invention;

FIG. 22 is a perspective view illustrating the insertion of a post into a prong grouping according to the fifth embodiment of the present invention;

FIGS. 24a–24d are perspective views illustrating the progressive translation steps of the post relative to the prong member according to the fifth embodiment of the present invention; and FIGS. 25a–25h are perspective views illustrating the progressive translation steps of a post relative to prong members according to a sixth embodiment of the present invention.

DETAILED DESCRIPTION OF THE PREFERRED EMBODIMENTS

Figure 1:
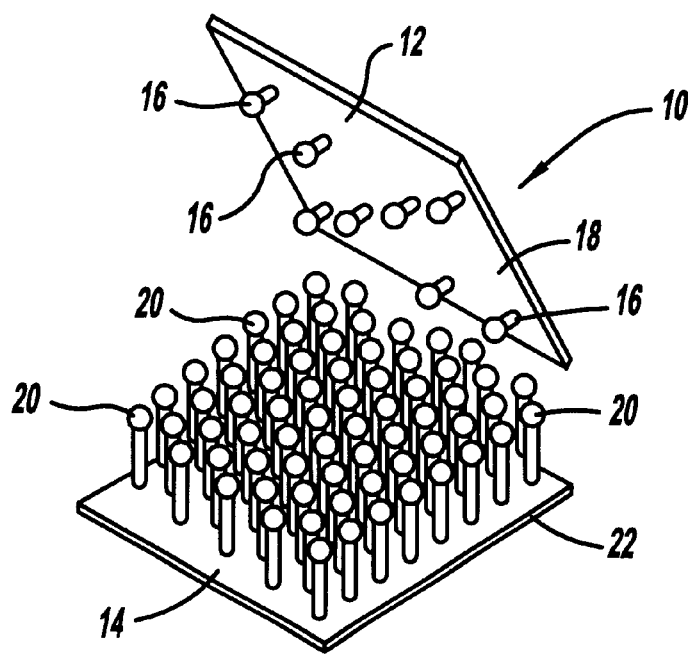
FIG. 1 is a perspective view illustrating an attachment mechanism according to a first embodiment of the present invention.

The following description of the preferred embodiments is merely exemplary in nature and is in no way intended to limit the invention, its application, or uses. For example, the present invention may find utility in a wide range of varying applications, such as, but not limited to, underwater vehicles; micro-manipulation of articles; shape control of three-dimensional spans, such as antennas; sorting and conveyor systems; adjustable sutures; prosthetics; and the like. Each application may includes a wide variety of scales, such as micro electro mechanical systems (MEMS) up to a very large scale. Moreover, the present invention may be used on non-planar surfaces, such that a moving member is able to climb various inclined surfaces, such as from a floor to a wall. While this technology is applicable to many applications, it will be described in reference to satellite docking within this application. This should not be interpreted to limit the scope of this application.

Referring to the figures, there is provided an attachment mechanism, generally indicated as reference numeral 10, that is capable of generating relative translation and rotation of two members, while simultaneously and actively retaining the pair of members in engagement. The cost and power required to achieve this relative motion is minimized to insure the system's feasibility as a docking alternative.

I. Attachment Mechanism Overview

Referring to FIGS. 1–11e, attachment mechanism 10 according to the principles of the present invention is provided and includes a first member 12 and a second member 14. According to this embodiment, first member 12 is "passive" and second member 14 is "active." This will be described in detail below. However, it should be readily understood that first member 12 and second member 14 may each be active or may include additional features, such as sensors and the like. Alternatively, first member 12 may be active and second member 14 may be passive. The term "passive," as used herein, is used purely for the purpose of illustration and should not be interpreted to mean completely inactive. For example, an active host has the ability to move the attached member about a general area. Alternatively, if the host is passive and the attached member is active, the attached member has the ability to "crawl" about a general area on the host.

First member 12 generally includes a plurality of posts or retaining features 16 generally extending orthogonally from a main body member 18. Preferably, the plurality of posts 16 are each formed integrally with main body member 18 in a known manner, such as, but not limited to, injection molding, stereo-lithography, and the like. It should be appreciated that the plurality of posts 16 may be formed according to a number of manufacturing methods depending on the particular characteristics attachment mechanism 10 will be used. As a result of the simplicity of design of first member 12, the weight of first member 12 is minimized, which is particularly conducive for use in space and satellite-type docking applications. The plurality of posts 16 are generally arranged in an array to facilitate the coupling or mating of the plurality of posts 16 with second member 14.

Second member 14 generally includes a plurality of prongs or retaining features 20 generally extending orthogonally from a main body member or base 22. Second member 14 is preferably mounted to the host, such as the orbiting satellite. The plurality of prongs are generally arranged in an array to facilitate the coupling or mating of the plurality of prongs 20 with each of the plurality of posts 16 of first member 12. The plurality of prongs 20 are sufficiently sized and positioned to cooperate with the plurality of posts 16 to effect a positive connection therebetween to join first member 12 to second member 14 through a press fit, interference fit, active retention, or the like. The specific shape and the associated fit characteristics of posts 16 and prongs 20 will be described in detail below.

Figure 2:
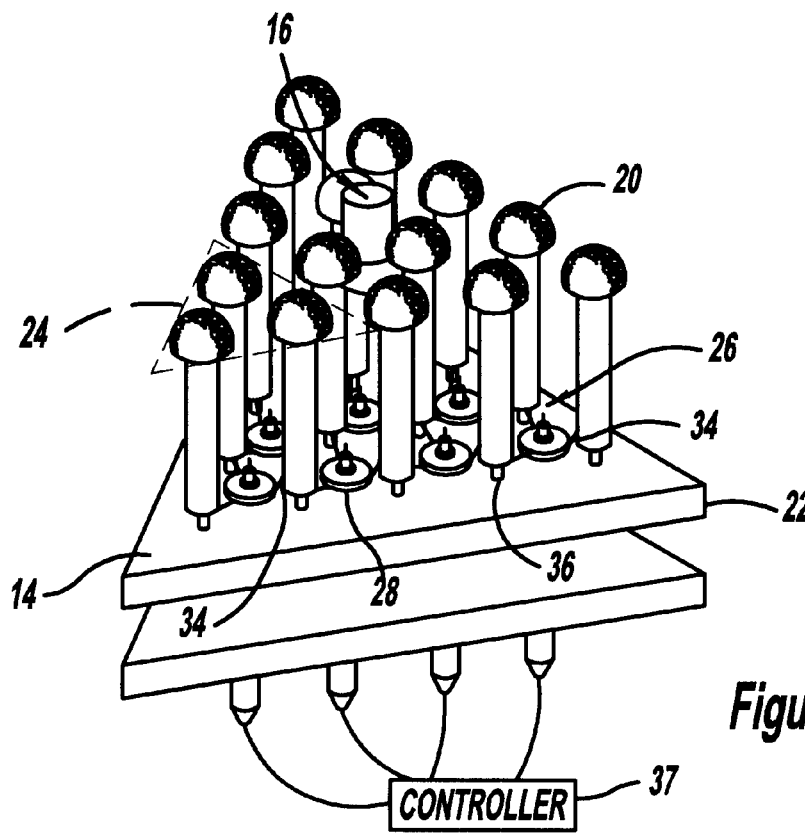
FIG. 2 is a perspective view illustrating the attachment mechanism illustrating the connection of the post and prong members.

After engagement, at least some of the plurality of posts 16 of first member 12 are entrapped or coupled to second member 14 through a prong grouping, generally indicated by reference numeral 24. As best seen in FIG. 2, prong grouping 24 of this embodiment generally consists of three prongs 20 arranged in a triangular formation. However, other formations of prongs may be used.

Figure 3:
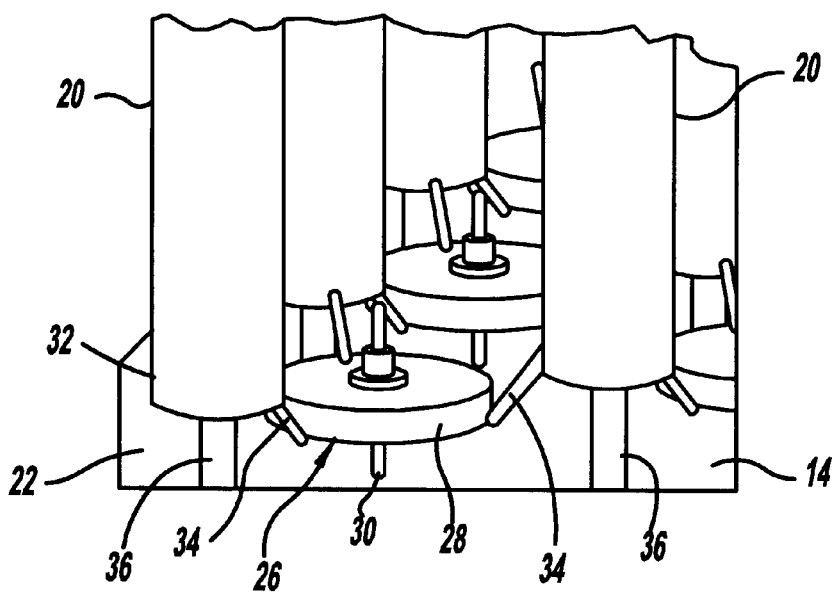
FIG. 3 is an enlarged perspective view illustrating a flexure mechanism.
Figure 4:
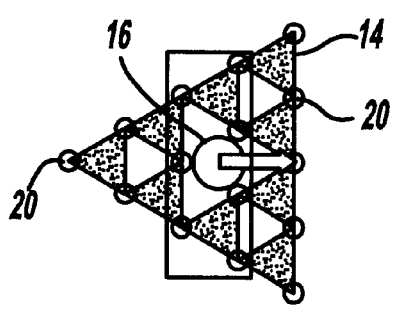
FIG. 4 is a plan view illustrating translation of the post relative to the prong members.

Referring to FIGS. 2 and 3, each prong 20 of prong grouping 24 is pivotally coupled to main body member 22 via a flexure member or hinge 36. Prong 20 is pivoted via an actuation mechanism 26. Actuation mechanism 26 includes an actuation member 28 located at the center of alternating prong groupings 24, which is coupled for movement with an actuation wire 30. Actuation member 28 is in turn coupled to a base portion 32 of each prong 20 of prong grouping 24 via a suspension wire 34.

It should be understood that each prong 20 may be coupled to as many as three different actuation mechanism 26, as illustrated in the present embodiment. Actuation wire 30 is preferably a Shape Memory Alloy (SMA) wire that contracts or expands in response to an electrical current applied thereto. The movement and associated work of actuation wire 30 are transmitted to actuation member 28 and suspension wires 34 to articulate or pivot prong grouping 24 into a predetermined position. More particularly, activation of actuation wire 30 causes each prong 20 of prong grouping 24 to flex inward about flexure member 36 to create a grasping action. Complex prong motions are generated by simultaneously activating multiple actuation wires 30. It should be understood that actuation wire 30 may be substituted by another actuation source, such as, but not limited to, piezoelectrics, electrostatics, electrostrictives, magnetostrictives, ferromagnetic shape memory alloys, or conventional means such as electromotors, electrostatics, hydraulics, or pneumatics, or the like. Furthermore, independent actuators may also be used to produce such movements. This invention should not be construed to be limited to using SMA. Actuation wires 30 are actuated in response to a controller 37.

Moreover, actuation of a single actuation wire 30 enable a specific post 16 to be grasped harder to released entirely. This will facilitate handing off of one host member to a second host member (i.e. one host grabs the article while the other host releases the article.)

In this embodiment, engagement between first member 12 and second member 14 occurs passively with a snap fit connection as first member 12 and second member 14 come in contact with each other. The plurality of prongs 20 on second member 14 are then activated by energizing groups of actuation wires 30 to translate, rotate, or otherwise manipulate first member 12 relative to second member 14 into a predetermined orientation and position, such as to achieve a docking arrangement.

II. Mechanism Operation

As described above, activating or articulating a single actuation wire 30 causes prongs 20 of prong grouping 24 to deflect inward towards the center of prong grouping 24 in a grasping action. This motion alone is unable of providing relative motion between first member 12 and second member 14. However, as seen in FIGS. 4–7, activating multiple adjacent actuation wires 30 simultaneously can generate relative motion. The basis for motion is founded on the fact that when two adjacent actuation wires 30 are activated, both individual prong groupings 24 will attempt to deflect inward toward actuation member 28 with the same grasping action. However, because there is a shared prong 20' between prong groupings 24, this individualistic motion is not possible. The shared prong 20' will instead move according to the resultant force vector A (see FIG. 6) provided by the combined work of the two energized actuation wires 30 that are attached to the shared prong 20'. This resultant force vector A is oriented perpendicular to a line connecting the two activated actuation wires 30', assuming the two activated actuation wires 30' are activated to produce an equal flexing force. It is anticipated that each actuation wire 30 could be actuated independently with a varying flexing force to produce resultant forces in various directions.

Figure 6:
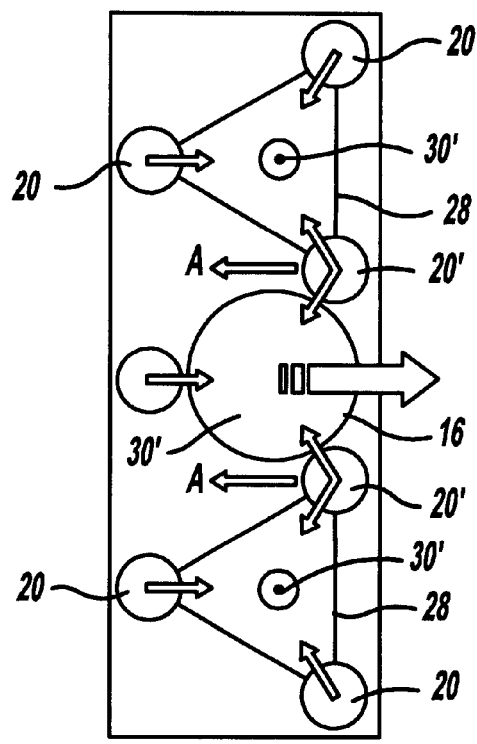
FIG. 6 is an enlarged plan view similar to FIG. 4.
Figure 5:
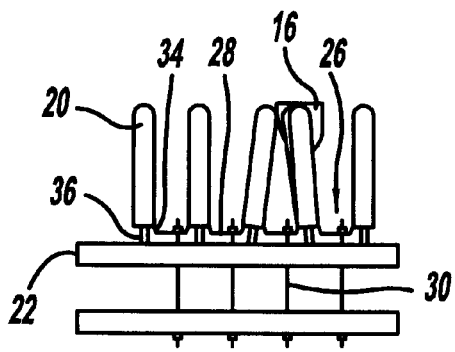
FIG. 5 is a side view illustrating translation of the post relative to the prong members.
Figure 7C:
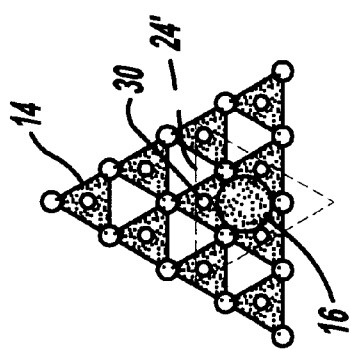
FIGS. 7a–7e are plan views illustrating the progressive translation steps of the post relative to the prong members.
Figure 7E:
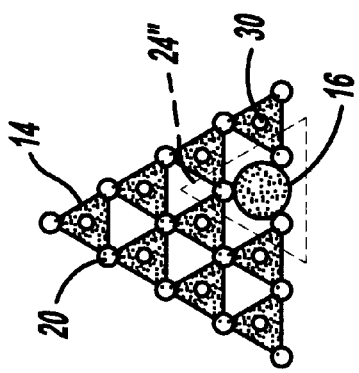
Figure 7B:
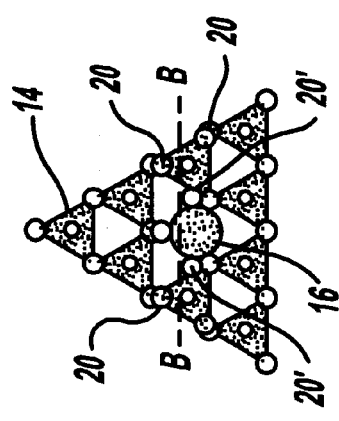
Figure 7D:
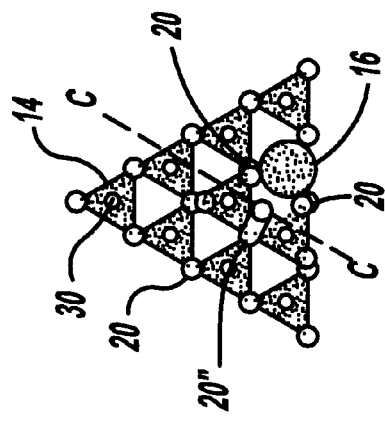
Figure 7A:
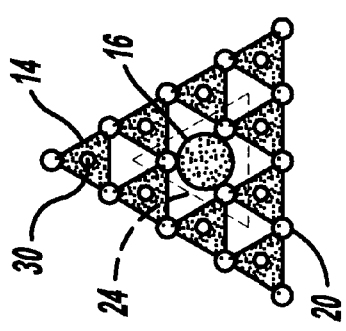

Still referring to FIG. 6, the combined activation of actuation wires 30 is utilized 1) to move prongs 20 out of the way of any advancing post 16 and 2) to help push the advancing post 16 to the next prong grouping 24. For example, as seen in FIGS. 7a–7e, post 16 is originally located inside a prong grouping 24 (FIG. 7a). To translate post 16 to another location within the array of prongs 20, three collinear actuation wires 30 adjacent to post 16, generally indicated as line B—B, are activated simultaneously (FIG. 7b). In this case, the two shared prongs 20', which originally entrapped post 16, move perpendicular to the row of activated actuation wires 30 (line B—B) and out of the way of the advancing post 16. Post 16 is thus advanced by the unshared prongs 20, which still deflects to the center of prong grouping 24. Thereby, the unshared prongs 20 push post 16 through the two shared prongs 20' to the next prong grouping 24' (FIG. 7c). This completes one translational step.

After this translation, post 16 is located in a prong grouping 24' that does not include an actuation wire 30 (FIG. 7c). Accordingly, a second type of translational step method is employed. That is, only two actuation wires 30" are energized along a line C—C, which results in only one shared prong 20" (FIG. 7d). Shared prong 20" pushes post 16 between the two unshared prongs 20 to the next prong grouping 24" (FIG. 7e). Prong grouping 24" has an actuation wire 30 and the cycle then repeats using the method described above. This process is repeated multiple times to translate post 16 relative to prongs 20, thereby moving first member 12 relative to second member 14 to a predetermined location in a saw-toothed motion. It can be applied to one or many posts 16 of first member 12. By altering the timing and directions of translation applied to each post 16 of first member 12, rotation of first member 12 relative to second member 14 may also be achieved. It should be understood that the direction of travel of post 16 is generally orthogonal to the row of energized actuation wires 30, as illustrated in the above example.

III. Prong Array Orientation

As described above, each prong grouping 24 preferably consists of three prongs 20 arranged in a triangular pattern. As a result of this orientation, the shape of the array of prongs 20 lends itself to also being triangularly shaped. However, there are particular advantages and disadvantages to various prong array configurations. Accordingly, depending on the working requirements, one array pattern may be better suited than another array pattern.

Figure 8A:
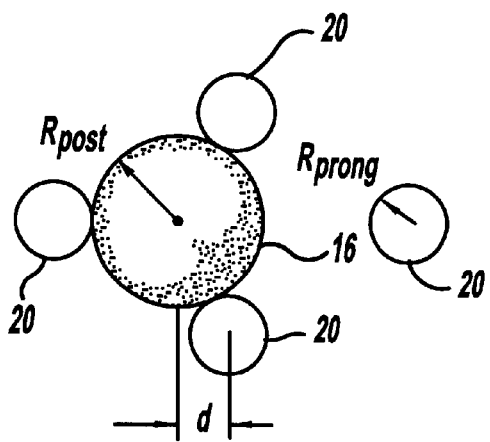
FIG. 8a is a schematic view illustrating a three-prong attachment mechanism.
Figure 8B:
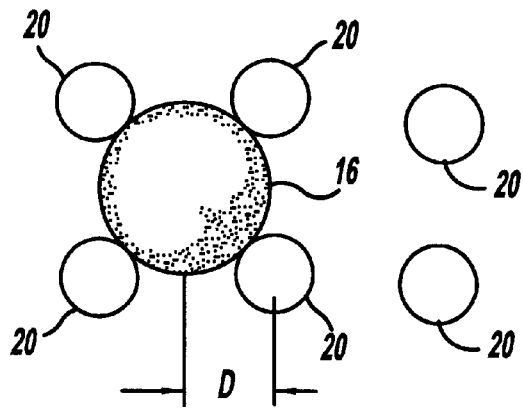
FIG. 8b is a schematic view illustrating a four-prong attachment mechanism.

Referring to FIGS. 8a and 8b, a triangular array (FIG. 8a) has the disadvantage of requiring a saw-tooth type translation motion as opposed to purely linear motion that would be provided by a four-prong or rectangular system (FIG. 8b).

Although the rectangular pattern of prongs of a four-prong system has the advantage of linear motion, the rectangular pattern has two key disadvantages: reduced system resolution and increased actuator demands. More particularly, as seen in FIGS. 8a and 8b, for given post and prong diameters, the center-to-center distance between prong groupings for the three-prong system is 29% smaller than the center-to-center distance between prong groupings for a four-prong system. That is, as seen in FIG. 8a, the three-prong configuration inherently includes a lateral translation distance d, which is equal to 0.50*(Radius of the post+Radius of the prong). Similarly, as seen in FIG. 8b, the four-prong configuration inherently includes a lateral translation distance D, which is equal to 0.707*(Radius of the post+Radius of the prong). This lateral translation distance (d and D) is representative of the minimum distance post 16 must be translated to achieve transfer of post 16 between adjacent prong groupings. Accordingly, a 29% improvement in the system resolution (defined as the smallest translation displacement/step) can be achieved with the three-prong system without decreasing the size of the individual components of the device. Additionally, 29% less actuator deflection is required to achieve each translation increment reducing the overall size and power requirements of the system.

Moreover, the three-prong system also leads to an overall pattern better suited for rotation relative to the four-prong system. Theoretically, for rotation, an array of prongs is ideally patterned such that concentric circular pathways exist about any given point. The closest approximation of the concentric circular pathway design that still provide generally linear movement is formed in the three-prong system. A three-prong system provides concentric rings of hexagonal pathways about any given location in the array. Therefore, first member 12 may be smoothly rotated about any given point on second member 14.

Figure 9:
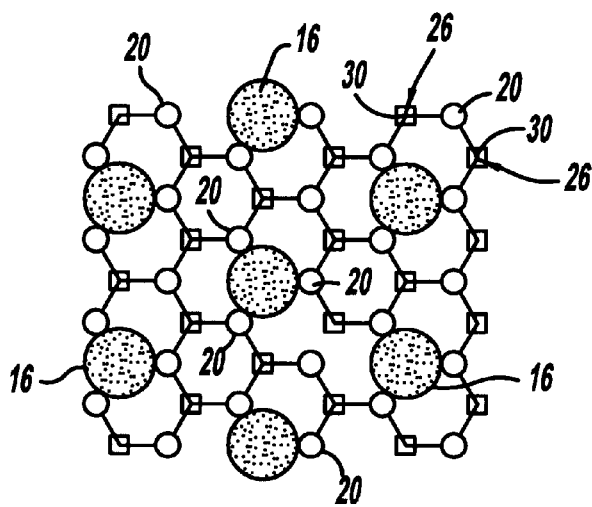
FIG. 9 is a schematic view illustrating the hexagonal array orientation of the three-prong attachment mechanism.

The hexagonal shape of prongs 20 offered by the three-prong system is best illustrated in FIG. 9. The repeat unit of this array is a hexagonal cell in which three corners of the hexagon are occupied by prongs 20 and the remaining three corners are occupied by actuation wires 30. The hexagon is the largest order regular polygon that can be arrayed without leaving irregular gaps in the pattern. For example, if regular octagons are arrayed, there will exist square shaped spaces at alternating sides of each octagon (a common household tiling pattern). These spaces result in areas in which engagement would be impaired between first member 12 and second member 14. Accordingly, for an arrayed system of regular polygons, a concentric ring of hexagonal pathways provides the best approximation to the ideal circular pathways.

IV. Prong/Post Topology Embodiments

Another primary function of attachment mechanism 10 is connection between first member 12 and second member 14, which is dependent on the topology or shape of post 16 and prongs 20. For a successful connection, there are a number of important design issues that should be considered. When post 16 of first member 12 approaches the array of prongs 20 of second member 14, post 16 should be guided into the center of prong grouping 24 rather than bouncing off. Thus, the engagement of posts 16 with prongs 20 should minimize the force required and be performed passively such that any capture systems need not be required. However, the force required to separate first member 12 from second member 14 should be sufficiently large to prevent premature separation of first member 12 from second member 14. Finally, the particular topology chosen should not impair relative motion or translation of first member 12 relative to second member 14.

Figure 10:
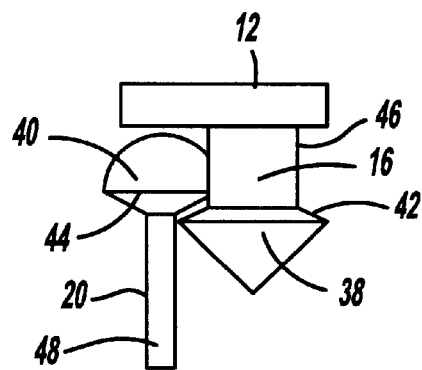
FIG. 10 is a side view illustrating the topology of the post and prong members.

Fortunately, the connection forces (engagement, retention) and required forces for motion generation (translation, rotation) can be modified independently by altering key features of the connection topology. The surfaces most directly affecting connection and motion are depicted in FIG. 10. Specifically, a lead surface 38 of post 16 and a lead surface 40 of prong 20 determine the force necessary for engagement. For example, elongating lead surface 40 of prong 20 from a spherical to a conical shape reduces the engagement force without affecting either the retention or required translation forces. An undercut surface 42 of post 16 and an undercut surface 44 of prong 20 primarily determine the retention force. For example, increasing the slope of undercut surface 44 of prong 20 reduces the retention force without affecting engagement or translation forces. A column 46 of post 16 and a column 48 of prong 20, together with the diameters of the connecting heads of both post 16 and prong 20, primarily determine the required force for translation and rotation. For example, decreasing the diameter of one column relative to a given diameter of the opposing head decreases the required forces for translation.

As should be appreciated, there is an infinite number of permutations possible for lead surfaces, undercuts, columns, diameters, spacing, etc, which all effect the final forces necessary for engagement, retention, translation, and rotation of first member 12 relative to second member 14. It should further be appreciated that the particular shape or topology of the head of post 16 and prong 20 further effects the forces and characteristics of the operation of attachment mechanism 10. However, in the interest of disclosure, particular head shapes used may include, but is not limited to, spheres, tetrahedrons, bulb-shapes, cones, mutually unique curves, and the like (see FIGS. 11a–11e) Moreover, there are a number of other coupling configurations.

A. Retracting Prong

Referring to FIGS. 12–15e, a retracting prong attachment mechanism 110 according to a separate embodiment is illustrated including a plurality of inactive posts 116 on a first member 112 and an array of active prongs 120 on a second member 114. By utilizing an entirely passive system on first member 112, cost, weight, and size are reduced. All control znecessary to perform the translation and rotation functions of retracting prong attachment mechanism 110 is located on the orbiting or second member 114.

Each of the plurality of posts 116 is conical in shape and designed to be fabricated by a manufacturing process, such as injection molding or stereo-lithography. This leads to an inexpensive lightweight connection surface that can be readily incorporated on the housing of a microsatellite. The conical shape of posts 116 reduces the required force to engage first member 112 to second member 114 while providing a much larger retention force.

As best seen in FIGS. 13a–13c, the plurality of prongs 120 on second member 114 perform a dual function. First, prongs 120 are designed to retain posts 116 of first member 112 when contact occurs. Second, prongs 120 act to position posts 116 and, thus, first member 112 into a predetermined position, location, and orientation.

Each prong 120 is comprised of a plurality of push/pull actuators 128, a plurality of sensor elements (not shown), a retraction actuator 130, a structural member 132, and a controller 134. Structural member 132 is rod-shaped with four hooks 136 located at the top such that hooks 136 extend downwardly to aid in guiding and retaining an advancing post 116 into a suitable position.

Four push/pull actuators 128 are attached along the side of structural member 132. These actuators are used to generate tip deflections of the prong in four directions. Push/pull actuators 128 are preferably constructed of either piezoelectric material or shape memory alloy (SMA) material in an antagonistic pull/pull mode. The usage of these lightweight, energy-dense materials is critical to keep the system weight and power consumption acceptable for low cost operation. However, it should be appreciated that other materials may be used with associated advantages and disadvantages.

To allow for translation and rotation, any impeding prongs 120 will need to be removed from the path of the advancing post. This task is accomplished with retraction actuator 130. To keep the surface low profile while providing the required motion, retraction actuator 130 is preferably a SMA spring. Retraction actuator 130 acts against a flexure mechanism 138, which returns post 116 to its raised position when power is removed.

Sensors may be incorporated to detect engagement of prong 120 and post 116. The sensors may be used by controller 134 to determine the required direction of motion to reach the desired docking location.

As best seen in FIGS. 14a–14c, engagement occurs passively as first member 112 impacts second member 114. Conical posts 116 of first member 112 enter prong groupings 124, consisting of four prongs 120 on second member 114. Post 116 spreads the four prongs 120 apart and engagement occurs when prongs 120 snap over the end of posts 116.

Referring now to FIGS. 15a–15e, motion is generated in four phases. First, prongs 120, which are impeding the desired motion, are retracted. This is accomplished by activating the appropriate push/pull actuator 128 to bend prong 120 away from the engaged post 116. SMA retraction actuator 130 is activated, lowering prong 120 below post 116. With the impeding prong 120 retracted, push/pull actuators 128 on prongs 120 still engaging post 116 are activated to push post 116 towards the next prong grouping 124. At the same time, prongs 120 of the next prong grouping 124 are bent toward advancing post 116. Once positive engagement has occurred between prongs 120 of the second prong grouping 124 and post 116, the second prong grouping 124 pull post 116 into the center of second prong grouping 124. The plurality of prongs 120 from the first prong grouping 124 are simultaneously returned to their original upright positions. After post 116 has successfully reached the center of the second prong grouping 124, power is removed from SMA retraction actuator 130, thus returning the retracted prong 120 to its upright position where it engages post 116 locking it into its translated position. The process is repeated for additional motion. The groups of prongs 120 that are activated depend on whether horizontal, vertical or rotational motion is desired.

B. Ratcheted Post

While piezoceramics are highly energy dense, their small deflections are often a limiting factor in a low profile system. To reduce the required deflection of each actuator, an alternative post design, generally indicated as reference numeral 216, has been developed. Referring now to FIGS. 16 to 18, in this approach, inactive post 216 includes a plurality of notches 230 formed thereon. During translation, each of the plurality of notches 230 act as intermediate steps to permit a ratcheting motion as post 216 is translated. As a result, prongs 220 need only deflect the distance between notches 230 and not the distance between posts 216.

The effect of notches 230 has the potential to increase the system performance in three areas. First, the reduced deflection required by prongs 220 and, thus, the actuators could reduce the size of the attachment mechanism. Such reduction in size could translate to a decrease in weight and cost. Second, prongs 220 of higher stiffness can be used to increase the translation and rotation force of the attachment mechanism. Third, piezoelectrics could be utilized to increase the translation speed and reduce the power consumption of the system because of the greatly reduced deflection of prongs 220.

Preferably, each of the plurality of prongs 20 employ ramps at the post-prong interface (see FIG. 18). The plurality of prongs 20 are orientated such that there are prongs with ramps facing each of the four cardinal directions. By vibrating the correctly orientated prong 220, motion can be generated in the desired direction. Prongs 220 that are obstructing motion will be either actively moved or passively bent out of the way. At all times, a hook 236 at the top of prongs 220 remains over the end of post 216.

C. Multiple Hinge

Referring now to FIGS. 19 to 20c, a multiple hinge attachment mechanism 310 is illustrated. Multiple hinge attachment mechanism 310 avoids the necessity of retracting prongs to allow for translation capabilities. Rather, a plurality of prongs 320 are provided that are capable of being directly pushed out of the way by an advancing post 316. Specifically, this is accomplished by utilizing discrete flexure hinges 328 in the material of prongs 320. That is, the varying modulus of elasticity of SMA material in the austenite and martensite phases creates the ability for the prong to act in two different modes when bonded to a properly designed substrate. When the SMA material is in the martensite (low stiffness) phase and coupled to substrate having a localized reduction in area, a post 316 passing thereover may easily bend prong 320. However, when the SMA is activated, the much higher stiffness of the austenite phase creates a bender that deflects in a similar fashion to a continuous beam with no flexures so as to easily move post 316 over a relatively soft martensite bender. The utilization of the stiffness varying proprieties of the SMA would eliminate the need to actively move prongs from the intended path of the post. Instead, post 316 would just push through prongs 320. The multiple hinge design could reduce the distance that post 316 would need to travel without increasing the length of prongs 320.

Motion is generated in a similar manner to retracting prong attachment mechanism 110 with one exception—retracting prong attachment mechanism 110 retracts the impeding prongs below an advancing post, where multiple hinge attachment mechanism 310 allows an advancing post to simply push over any impeding prongs. This eliminates the need for the SMA retraction actuator 130 from each prong grouping. Accordingly, multiple hinge attachment mechanism 310 reduces the number of parts necessary and further simplifies the control system by eliminating the retraction step.

D. Interference Fit

The discrete hook features at the end of the aforementioned prongs aid in preventing separation of the first member from the second member, however, such hook features at least minimally increase the difficulty in translating a post between prong groupings. Accordingly, as illustrated in FIGS. 21 to 23b, an interference fit attachment mechanism 410 is provided in which friction between prongs 420 and posts 416 provides the necessary retention force. With the removal of the aforementioned head topology, obstructions are removed from the path of an advancing post. According to the present embodiment, when first member 412 and second member 414 contact each other, friction between post 416 and prongs 420 hold first member 412 and second member 414 together. Moreover, interference fit attachment mechanism 410 further provides the ability to effect relative motion between first member 412 and second member 414 by simply bending the appropriate prongs 420.

As seen in FIG. 21, engagement occurs between a patterned array of inactive posts 416 located on first member 412 and an active array of prongs 420 located on second member 414. Referring to FIG. 22, an inserting post 416 enters a grouping of four active prongs 420, spreading them open slightly. Friction between post 416 and prongs 420 retains first member 412 to second member 414.

Essential to the success of the design is minimizing the engagement force while maximizing the retention force. To this end, incorporation of a series of burrs 428 located on each post 416 of first member 412 is used (FIG. 22). Burrs 428 serve to significantly increase the friction upon retraction with a minimal increase in the required engagement force. This method of retention imposes the least amount of obstruction to translation and rotation than a design, which incorporates hooks located on the active prongs. However, this method may not provide the necessary retention reliability necessary in some applications.

Figure 23A:
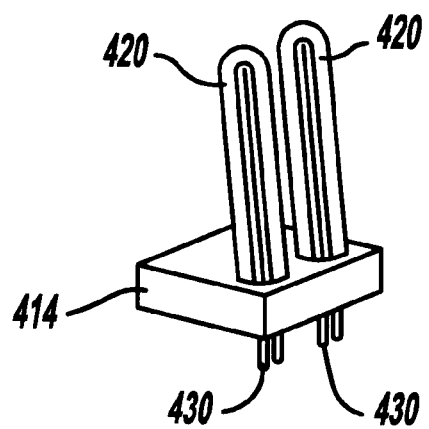
FIG. 23a is a perspective view illustrating the prong members in an inactivated position.
Figure 23B:
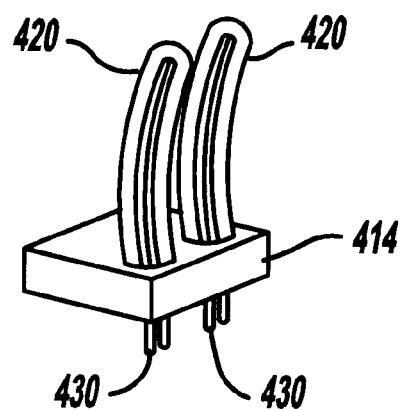
FIG. 23b is a perspective view illustrating the prong members in an activated position.

As seen in FIGS. 23a and 23b, motion of prongs 420 is generated through the use of imbedded SMA wires 430 inside prongs 420. Preferably, prongs 420 are made of a resin material capable of being formed about wires 430. Because electrical current is the intended means of actuating SMA wires 430, an electrical path across SMA wire 430 is needed. To achieve this, SMA wire 430 is doubled over inside prong 420 to provide a continuous current path. Current is then applied across the protruding leads of SMA wire 430 to heat wire 430. The programmed shape of wire 430 bends prong 420 over with the exterior resin acting as the biasing means to return post 416 to its normally vertical position.

As best seen in FIGS. 24a–24d, motion of first member 412 relative to second member 414 is generated by activating the appropriate prongs 420' to force a bending movement. In addition to prongs 420' bending over, they are stiffened by the increase in the elastic modulus during the phase transformation from martensite to austenite. The increased stiffness allows the activated prongs 420' to push post 416 through the inactive impeding prongs 420. As post 416 is actively pushed past the equator of the impeding prongs 420, post 416 will snap into the next prong grouping 424, thereby completing one translation step. The following set of prongs 420' is then activated to continue the motion. Since a given prong 420 is only activated a small portion of the time, there is ample time between activated cycles to cool and thus allow for motion at moderate speeds.

E. Rotating Prong Interference Fit

Referring now to FIGS. 25a–25f, a rotating prong interference fit attachment mechanism 510 is provided, which is based upon the same engagement principles as interference fit attachment mechanism 410. Engagement occurs between an array of inactive posts 516 on the first member (not shown) and an array of active prongs 520 on a second member 514. Retention of first member and second member 514 is accomplished by friction, amplified through the incorporation of burrs, between posts 516 and prongs 520.

The generation of motion is the differentiating aspect between rotating prong interference fit attachment mechanism 510 and interference fit attachment mechanism 410. As best seen in FIGS. 25a–25f, motion is created by rotating deflected prongs 520' instead of simply bending them over. The key to the operation lies in the phase delay of rotating prongs 520. The phasing of prongs 520 allow the impeding prongs 520' to rotate out of the way just as pushing prongs 520 drive post 516 through to the next prong grouping 524.

This method has both advantages and disadvantages over the previously discussed design. While the individual prong motion is more complex, the global system operation is simplified because the basic prong motion is identical for multiple directions of satellite translation. This is in direct contrast to the previous design, which required a different prong motion for each direction. The direction of satellite motion is controlled by the direction of rotation of each prong and the phase delay between each prong. Rotation of a first body containing a plurality of posts 416 is made possible by the flexibility of the inactivated prongs allowing the stronger activated prongs to force first member through any interference.

The attachment mechanism described herein provides a device that has the ability to effect relative motion between two members while simultaneously maintaining positive attachment. Moreover, the attachment mechanisms described herein each have the unique potential to minimize the need for complex guidance systems and/or docking/coupling mechanism which relied on precise orientation. That is, the attachment mechanisms of the present invention permit a positive connection to be maintained between two members while the members are translated or rotated relative to each other to the precise location required.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An attachment mechanism comprising:
    a first attachment member supported by a first body, said first attachment member having an engaging portion;
    a plurality of second attachment members supported by a second body each of said plurality of second attachment members having an engaging portion selectively engageable with said engaging portion of said first attachment member to define an entrapping connection between said first attachment member and at least one of said plurality of second attachment members; and
    an actuation device coupled with said plurality of second attachment members; said actuation device being operable to selectively actuate said plurality of second attachment members relative to said first attachment member to positionally manipulate said first body relative to said second body while maintainihg said entrapping connection.

2. The attachment mechanism according to claim 1 wherein said actuation device comprises:
    an actuation member operably coupled to at least one of said plurality of second attachment members;
    a controller outputting an actuation signal in said activated mode; and
    an interconnecting member interconnecting said controller to said actuation member, said interconnecting member actuating said actuation member in response to said actuation signal.

3. The attachment mechanism according to claim 1 wherein said plurality of second attachment members are arranged relative to each other such that adjacent members are generally in a rectangular pattern.

4. The attachment mechanism according to claim 1 wherein said plurality of second attachment members are arranged relative to each other such that adjacent members are generally in a triangular pattern.

5. The attachment mechanism according to claim 4 wherein said triangularly arranged plurality of second attachment members generally define a hexagonal array.

6. The attachment mechanism according to claim 1, further comprising:
   a retraction mechanism coupled with said plurality of second attachment members, said retraction mechanism operable to selectively retract at least one of said plurality of second attachment members relative to a plane defined by the remaining of said plurality of second attachment members to permit translation of said first body relative to said second body.

7. The attachment mechanism according to claim 6 wherein said retraction mechanism comprises:
   a retraction controller outputting a control signal;
   a retraction member coupled to each of said plurality of second attachment members, said retraction member operable to retract in response to said control signal from said retraction controller; and
   a biasing member biasing each of said plurality of second attachment members into an unretracted position.

8. The attachment mechanism according to claim 7 wherein said retraction member is made of a shape memory alloy.

9. An attachment mechanism comprising:
   a first attachment member supported by a first body, said first attachment member having an engaging portion;
   a plurality of second attachment members supported by a second body, each of said plurality of second attachment members having an engaging portion selectively engageable with said engaging portion of said first attachment member; and
   an actuation device coupled with said plurality of second attachment members, said actuation device being operable to selectively actuate said plurality of second attachment members relative to said first attachment member to positionally manipulate said first body relative to said second body, said actuation device having:
      an actuation member operably coupled to at least one of said plurality of second attachment members;
      a controller outputting an actuation signal in said activated mode; and
      an interconnecting member interconnecting said controller to said actuation member, said interconnecting member actuating said actuation member in response to said actuation signal, said interconnecting member being made of a shape memory alloy.

10. An attachment mechanism comprising:
    a first attachment member supported by a first body, said first attachment member having an engaging portion;
    a plurality of second attachment members supported by a second body, each of said plurality of second attachment members having an engaging portion selectively engageable with said engaging portion of said first attachment member; and
    an actuation device coupled with said plurality of second attachment members, said actuation device being operable to selectively actuate said plurality of second attachment members relative to said first attachment member to positionally manipulate said first body relative to said second body, said actuation device having:
       an actuation member operably coupled to at least one of said plurality of second attachment members;
       a controller outputting an actuation signal in said activated mode; and
       an interconnecting member interconnecting said controller to said actuation member, said interconnecting member actuating said actuation member in response to said actuation signal, said interconnecting member flexes in response to an electrical current applied thereto.

11. An attachment mechanism comprising:
    a first attachment member supported by a first body, said first attachment member having an engaging portion;
    a plurality of second attachment members supported by a second body, each of said plurality of second attachment members having an engaging portion selectively engageable with said engaging portion of said first attachment member; and
    an actuation device coupled with said plurality of second attachment members, said actuation device being operable to selectively actuate said plurality of second attachment members relative to said first attachment member to positionally manipulate said first body relative to said second body,
    wherein the shape of said engaging portion of said first attachment member is chosen from the group essentially consisting of spherical, conical, bulbous, tetrahedral, and hook.

12. An attachment mechanism comprising:
    a first attachment member supported by a first body, said first attachment member having an engaging portion;
    a plurality of second attachment members supported by a second body, each of said plurality of second attachment members having an engaging portion selectively engageable with said engaging portion of said first attachment member; and
    an actuation device coupled with said plurality of second attachment members, said actuation device being operable to selectively actuate said plurality of second attachment members relative to said first attachment member to positionally manipulate said first body relative to said second body,
    wherein the shape of said engaging portion of at least one of said plurality of second attachment members is chosen from the group essentially consisting of spherical, conical, bulbous, tetrahedral, and hook.

13. An attachment mechanism comprising:
    a first attachment member supported by a first body, said first attachment member having an engaging portion;
    a plurality of second attachment members supported by a second body, each of said plurality of second attachment members having an engaging portion selectively engageable with said engaging portion of said first attachment member; and
    an actuation device coupled with said plurality of second attachment members, said actuation device being operable to selectively actuate said plurality of second attachment members relative to said first attachment member to positionally manipulate said first body relative to said second body,
    wherein the shape of said engaging portions of said first attachment member and said plurality of second attachment members is such that the force required to engage said engaging portion of said first attachment member with said engaging portions of said plurality of second attachment members is less than the force necessary to release said first attachment member from said plurality of said second attachment members.

14. An attachment mechanism comprising:
a first attachment member supported by a first body, said first attachment member having an engaging portion;
a plurality of second attachment members supported by a second body, each of said plurality of second attachment members having an engaging portion selectively engageable with said engaging portion of said first attachment member; and
an actuation device coupled with said plurality of second attachment members, said actuation device being operable to selectively actuate said plurality of second attachment members relative to said first attachment member to positionally manipulate said first body relative to said second body;
wherein said engaging portion of said first attachment member comprises a plurality of notches, each of said plurality of notches cooperates with said engaging portion of each of said plurality of second attachment members to define a ratcheting movement of said first body relative to said second body.

15. The attachment mechanism according to claim 14 wherein said engaging portion of each of said plurality of second attachment members comprises a generally inclined portion to facilitate said movement of said first body relative to said second body.

16. An attachment mechanism comprising:
a first attachment member supported by a first body, said first attachment member having an engaging portion;
a plurality of second attachment members supported by a second body, each of said plurality of second attachment members having an engaging portion selectively engageable with said engaging portion of said first attachment member; and
an actuation device coupled with said plurality of second attachment members, said actuation device being operable to selectively actuate said plurality of second attachment members relative to said first attachment member to positionally manipulate said first body relative to said second body;
wherein each of said plurality of second attachment members comprises a main body portion and a hinge disposed along said main body portion, said hinge being manipulated in response to phase changes in the material of each of said plurality of second attachment members.

17. An attachment mechanism comprising:
a first attachment member supported by a first body, said first attachment member having an engaging portion;
a plurality of second attachment members supported by a second body, each of said plurality of second attachment members having an engaging portion selectively engageable with said engaging portion of said first attachment member; and
an actuation device coupled with said plurality of second attachment members, said actuation device being operable to selectively actuate said plurality of second attachment members relative to said first attachment member to positionally manipulate said first body relative to said second body,
wherein said first attachment member comprises a plurality of burrs to resist disengagement of said first attachment member from said plurality of second attachment members.

18. An attachment mechanism comprising:
a first attachment member supported by a first body, said first attachment member having an engaging portion;
a plurality of second attachment members supported by a second body, each of said plurality of second attachment members having an engaging portion selectively engageable with said engaging portion of said first attachment member; and
an actuation device coupled with said plurality of second attachment members, said actuation device being operable to selectively actuate said plurality of second attachment members relative to said first attachment member to positionally manipulate said first body relative to said second body, said actuation device having:
an actuation member operably disposed within at least one of said plurality of second attachment members, the shape of said actuation member being changeable in response to an electrical current signal; and
a controller outputting said electrical current signal.

19. The attachment mechanism according to claim 18 wherein said actuation member is made of a shape memory alloy.

20. An attachment mechanism comprising:
a first attachment member supported by a first body, said first attachment member having an engaging portion;
a plurality of second attachment members supported by a second body, each of said plurality of second attachment members having an engaging portion selectively engageable with said engaging portion of said first attachment member; and
an actuation device coupled with said plurality of second attachment members, said actuation device being operable to selectively actuate said plurality of second attachment members relative to said first attachment member to positionally manipulate said first body relative to said second body, wherein said first attachment member is a post.

21. An attachment mechanism comprising:
a first attachment member supported by a first body, said first attachment member having an engaging portion;
a plurality of second attachment members supported by a second body, each of said plurality of second attachment members having an engaging portion selectively engageable with said engaging portion of said first attachment member; and
an actuation device coupled with said plurality of second attachment members, said actuation device being operable to selectively actuate said plurality of second attachment members relative to said first attachment member to positionally manipulate said first body relative to said second body, wherein at least one of said plurality of second attachment members is a prong.

22. An attachment mechanism comprising:
a first attachment member supported by a first body, said first attachment member having an engaging portion;
a plurality of second attachment members supported by a second body, each of said plurality of second attachment members having an engaging portion passively connectable with said engaging portion of said first attachment member to define a mechanical connection; and
a driving mechanism coupled with said plurality of second attachment members, said driving mechanism selectively actuates said plurality of second attachment members relative to said first attachment member to translate said first body relative to said second body while maintaining said mechanical connection.

23. The attachment mechanism according to claim 22 wherein the shape of said engaging portion of said first attachment member is chosen from the group essentially consisting of spherical, conical, bulbous, tetrahedral, and hook.

24. The attachment mechanism according to claim 22 wherein the shape of said engaging portion of at least one of said plurality of second attachment members is chosen from the group essentially consisting of spherical, conical, bulbous, tetrahedral, and hook.

25. The attachment mechanism according to claim 22 wherein the shape of said engaging portions of said first attachment member and said plurality of second attachment members is such that the force required to engage said engaging portion of said first attachment member with said engaging portions of said plurality of second attachment members is less than the force necessary to release said first attachment member from said plurality of said second attachment members.

26. The attachment mechanism according to claim 22 wherein each of said plurality of second attachment members comprises a main body portion and a hinge disposed along said main body portion, said hinge being manipulated in response to phase changes in the material of each of said plurality of second attachment members.

27. The attachment mechanism according to claim 22 wherein said first attachment member comprises a plurality of burrs to resist disengagement of said first attachment member from said plurality of second attachment members.

28. The attachment mechanism according to claim 22 wherein said plurality of second attachment members are arranged relative to each other such that adjacent members are generally in a rectangular pattern.

29. The attachment mechanism according to claim 22 wherein said first attachment member is a post.

30. The attachment mechanism according to claim 22 wherein at least one of said plurality of second attachment members is a prong.

31. The attachment mechanism according to claim 22, further comprising:
a retraction mechanism coupled with said plurality of second attachment members, said retraction mechanism operable to selectively retract at least one of said plurality of second attachment members relative to a plane defined by the remaining of said plurality of second attachment members to permit translation of said first body relative to said second body.

32. The attachment mechanism according to claim 31 wherein said retraction mechanism comprises:
a retraction controller outputting a control signal;
a retraction member coupled to each of said plurality of second attachment members, said retraction member operable to retract in response to said control signal from said retraction controller; and
a biasing member biasing each of said plurality of second attachment members into an unretracted position.

33. The attachment mechanism according to claim 32 wherein said retraction member is made of a shape memory alloy.

34. The attachment mechanism according to claim 22 wherein said engaging portion of said first attachment member comprises a plurality of notches, each of said plurality of notches cooperates with said engaging portion of each of said plurality of second attachment members to define a ratcheting movement of said first body relative to said second body.

35. The attachment mechanism according to claim 34 wherein said engaging portion of each of said plurality of second attachment members comprises a generally inclined portion to facilitate said movement of said first body relative to said second body.

36. The attachment mechanism according to claim 22 wherein said driving mechanism comprises:
an actuation member operably disposed within at least one of said plurality of second attachment members, the shape of said actuation member being changeable in response to an electrical current signal; and
a controller outputting said electrical current signal.

37. The attachment mechanism according to claim 36 wherein said actuation member is made of a shape memory alloy.

38. The attachment mechanism according to claim 22 wherein said plurality of second attachment members are arranged relative to each other such that adjacent members are generally in a triangular pattern.

39. The attachment mechanism according to claim 38 wherein said triangularly arranged plurality of second attachment members generally define a hexagonal array.

40. The attachment mechanism according to claim 22 wherein said driving mechanism comprises:
an actuation member operably coupled to at least one of said plurality of second attachment members to selectively flex said at least one second attachment member;
a controller outputting an actuation signal; and
an interconnecting member disposed between said controller and said actuation member, said interconnecting member actuating said actuation member in response to said actuation signal.

41. The attachment mechanism according to claim 40 wherein said interconnecting member is made of a shape memory alloy.

42. The attachment mechanism according to claim 40 wherein said interconnecting member flexes in response to an electrical current applied thereto.

* * * * *